(12) United States Patent
Studyvin et al.

(10) Patent No.: US 7,821,230 B2
(45) Date of Patent: Oct. 26, 2010

(54) METHOD AND SYSTEM FOR CELL EQUALIZATION WITH SWITCHED CHARGING SOURCES

(75) Inventors: William B. Studyvin, Cherokee, KS (US); Eric Coatney, Bronaugh, MO (US); Tim Pennock, Webb City, MO (US); Phillip Shimp, Diamond, MO (US); Greg Miller, Diamond, MO (US)

(73) Assignee: EaglePicher Technologies, Joplin, MO (US)

( * ) Notice: Subject to any disclaimer, the term of this patent is extended or adjusted under 35 U.S.C. 154(b) by 0 days.

(21) Appl. No.: 12/498,210

(22) Filed: Jul. 6, 2009

(65) Prior Publication Data

US 2009/0309544 A1 Dec. 17, 2009

Related U.S. Application Data

(63) Continuation of application No. 11/163,669, filed on Oct. 26, 2005, now abandoned.

(60) Provisional application No. 60/522,814, filed on Nov. 10, 2004.

(51) Int. Cl.
*H02J 7/00* (2006.01)
(52) U.S. Cl. .................... 320/119; 320/122
(58) Field of Classification Search .............. 320/118
See application file for complete search history.

(56) References Cited

U.S. PATENT DOCUMENTS 4,238,721 A 12/1980 Deluca et al.

| | | |
|---|---|---|
| 4,467,266 A | 8/1984 | Ritchie |
| 5,498,950 A | 3/1996 | Ouwerkerk |
| 5,504,415 A | 4/1996 | Podrazhansky et al. |
| 5,592,067 A | 1/1997 | Peter et al. |
| 5,631,534 A | 5/1997 | Lewis |
| 5,656,915 A | 8/1997 | Eaves |
| 5,659,208 A | 8/1997 | Kimble et al. |
| 5,710,504 A | 1/1998 | Pascual et al. |
| 5,811,959 A | 9/1998 | Kejha |
| 5,821,733 A | 10/1998 | Turnbull |
| 5,850,136 A | 12/1998 | Kaneko |
| 5,867,007 A | 2/1999 | Kim |

(Continued)

FOREIGN PATENT DOCUMENTS

JP  08237861  9/1996

OTHER PUBLICATIONS

Office Action mailed from the USPTO in U.S. Appl. No. 11/163,667, filed Jul. 25, 2008.

(Continued)

*Primary Examiner*—Edward Tso
*Assistant Examiner*—Ramy Ramadan
(74) *Attorney, Agent, or Firm*—Armstrong Teasdale LLP

(57) ABSTRACT

A system and method for charging a rechargeable, or secondary, battery including a series string of cells, includes a topology of charging sources that selectively provides charging current to cells that need to be charged, but avoids overcharging cells that are already charged above a predetermined voltage threshold. Based on individual cell voltage measurements, the charging current is controlled in a manner to direct charging current to the battery cell(s) needing charge until these cells are fully charged, and by-passes battery cells that are fully charged or become fully charged.

16 Claims, 6 Drawing Sheets

U.S. PATENT DOCUMENTS

| | | | |
|---|---|---|---|
| 5,920,179 | A | 7/1999 | Pedicini |
| 5,945,804 | A | 8/1999 | Hansson et al. |
| 5,965,996 | A | 10/1999 | Arledge et al. |
| 6,064,178 | A | 5/2000 | Miller |
| 6,094,031 | A | 7/2000 | Shimane et al. |
| 6,097,174 | A | 8/2000 | Yang et al. |
| 6,140,800 | A | 10/2000 | Peterson |
| 6,150,795 | A | 11/2000 | Kutkut et al. |
| 6,157,167 | A | 12/2000 | Schwartz et al. |
| 6,181,106 | B1 | 1/2001 | Finger |
| 6,222,344 | B1 | 4/2001 | Peterson et al. |
| 6,268,710 | B1 | 7/2001 | Koga |
| 6,316,917 | B1 | 11/2001 | Ohta |
| 6,326,768 | B2 | 12/2001 | Nagai et al. |
| 6,377,024 | B1 | 4/2002 | Choy |
| 6,388,424 | B1 | 5/2002 | Hidaka et al. |
| 6,441,583 | B1 | 8/2002 | Perelle |
| 6,452,363 | B1 | 9/2002 | Jabaji |
| 6,580,249 | B2 | 6/2003 | Yau et al. |
| 6,580,251 | B2 | 6/2003 | Takeuchi |
| 6,586,917 | B1 | 7/2003 | Smith |
| 6,608,470 | B1 | 8/2003 | Oglesbee et al. |
| 6,703,722 | B2 | 3/2004 | Christensen |
| 6,791,297 | B2 | 9/2004 | Ott et al. |
| 6,822,423 | B2 * | 11/2004 | Yau et al. .................... 320/122 |
| 6,841,971 | B1 | 1/2005 | Spee et al. |
| 6,983,212 | B2 | 1/2006 | Burns |
| 7,061,207 | B2 | 6/2006 | Patel et al. |
| 2002/0047685 | A1 | 4/2002 | Perelle |
| 2002/0084770 | A1 | 7/2002 | Jabaji |
| 2002/0195994 | A1 | 12/2002 | Perelle |
| 2003/0042870 | A1 | 3/2003 | Yau et al. |
| 2003/0113600 | A1 | 6/2003 | Wardrop et al. |
| 2003/0139888 | A1 | 7/2003 | Burns |
| 2003/0160593 | A1 | 8/2003 | Yau et al. |
| 2003/0218446 | A1 | 11/2003 | Beerwerth et al. |
| 2004/0012371 | A1 | 1/2004 | Ott et al. |
| 2004/0135544 | A1 | 7/2004 | King et al. |
| 2004/0145346 | A1 | 7/2004 | Hall et al. |
| 2004/0164706 | A1 | 8/2004 | Osborne |
| 2006/0097696 | A1 | 5/2006 | Studyvin |
| 2006/0097697 | A1 | 5/2006 | Studyvin et al. |
| 2006/0097700 | A1 | 5/2006 | Studyvin |
| 2007/0063670 | A1 | 3/2007 | Taurand |

OTHER PUBLICATIONS

Office Action mailed from the USPTO in U.S. Appl. No. 11/163,667, filed Feb. 6, 2008.

Office Action mailed from the USPTO in U.S. Appl. No. 11/163,667, filed Sep. 11, 2007.

Office Action mailed from the USPTO in U.S. Appl. No. 11/163,668, filed Jun. 26, 2007.

Office Action mailed from the USPTO in U.S. Appl. No. 11/163,668, filed Feb. 21, 2008.

* cited by examiner

FIG. 4

CONTROL TRUTH TABLE

| 1 | 2 | 3 | 4 | 5 | 6 | 7 | 8 | 9 | 10 | 11 | 12 | 13 |
|---|---|---|---|---|---|---|---|---|----|----|----|----|
|   | BATTERY CELL 342 | BATTERY CELL 344 | BATTERY CELL 346 | BATTERY CELL 348 | CHARGING SOURCE 312 | CHARGING SOURCE 314 | CHARGING SOURCE 316 | CHARGING SOURCE 318 | CHARGING SOURCE 334 | CHARGING SOURCE 336 | CHARGING SOURCE 338 | CHARGING OPERATION |
| 1 | LOW | LOW | LOW | LOW | ON | OFF | OFF | OFF | OFF | OFF | OFF | ALL BATTERY CELLS CHARGING |
| 2 | LOW | LOW | LOW | HIGH | ON | OFF | OFF | OFF | OFF | OFF | ON | BATTERY CELLS 342, 344,346 CHARGING |
| 3 | LOW | LOW | HIGH | LOW | ON | OFF | OFF | ON | OFF | OFF | OFF | BATTERY CELLS 342, 344,348 CHARGING |
| 4 | LOW | LOW | HIGH | HIGH | ON | OFF | OFF | OFF | ON | OFF | OFF | BATTERY CELLS 342, 344 CHARGING |
| 5 | LOW | HIGH | LOW | LOW | ON | OFF | ON | OFF | OFF | OFF | OFF | BATTERY CELLS 342, 346,348 CHARGING |
| 6 | LOW | HIGH | LOW | HIGH | ON | OFF | OFF | ON | OFF | OFF | OFF | BATTERY CELLS 342, 346 CHARGING |
| 7 | LOW | HIGH | HIGH | LOW | ON | OFF | OFF | OFF | OFF | OFF | OFF | BATTERY CELLS 342 348 CHARGING |
| 8 | LOW | HIGH | HIGH | HIGH | ON | OFF | OFF | OFF | OFF | OFF | OFF | BATTERY CELL 342 CHARGING |
| 9 | HIGH | LOW | LOW | LOW | OFF | ON | OFF | OFF | OFF | OFF | OFF | BATTERY CELLS 344, 346,348 CHARGING |
| 10 | HIGH | LOW | LOW | HIGH | OFF | ON | OFF | OFF | OFF | OFF | OFF | BATTERY CELLS 344, 346 CHARGING |
| 11 | HIGH | LOW | HIGH | LOW | OFF | ON | OFF | OFF | OFF | OFF | OFF | BATTERY CELLS 344, 348 CHARGING |
| 12 | HIGH | LOW | HIGH | HIGH | OFF | OFF | OFF | OFF | OFF | ON | OFF | BATTERY CELL 344 CHARGING |
| 13 | HIGH | HIGH | LOW | LOW | OFF | OFF | ON | OFF | OFF | OFF | OFF | BATTERY CELLS 346, 348 CHARGING |
| 14 | HIGH | HIGH | LOW | HIGH | OFF | OFF | ON | OFF | OFF | OFF | OFF | BATTERY CELL 346 CHARGING |
| 15 | HIGH | HIGH | HIGH | LOW | OFF | OFF | OFF | OFF | OFF | OFF | OFF | BATTERY CELL 348 CHARGING |
| 16 | HIGH | HIGH | HIGH | HIGH | OFF | OFF | OFF | OFF | OFF | OFF | OFF | NO BATTERY CELLS CHARGING |

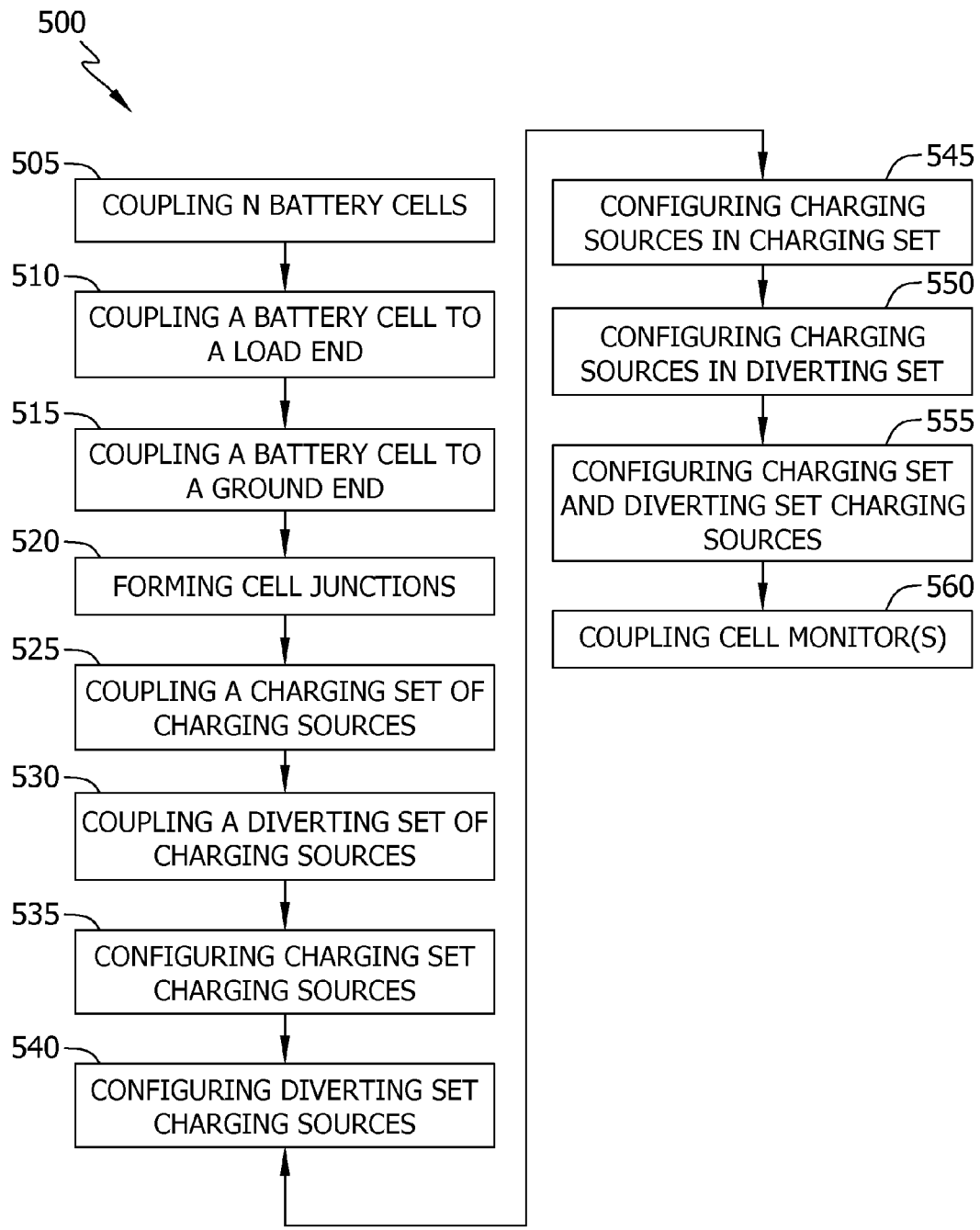

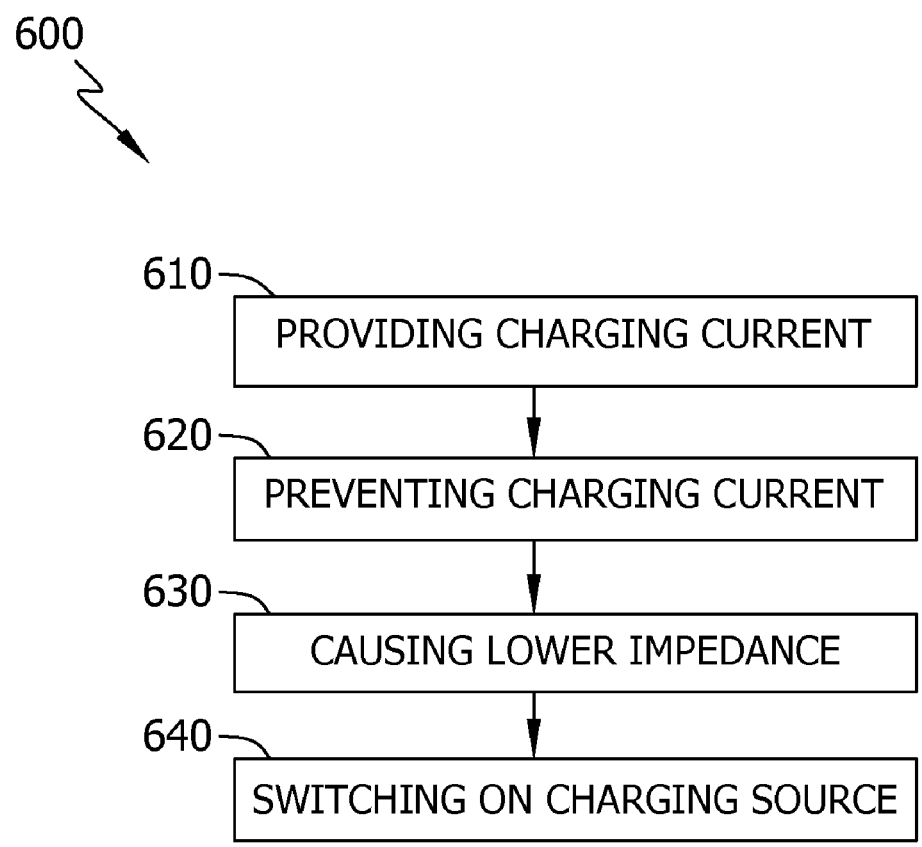

METHOD AND SYSTEM FOR CELL EQUALIZATION WITH SWITCHED CHARGING SOURCES

CROSS REFERENCE TO RELATED APPLICATIONS

This application is a continuation application of U.S. application Ser. No. 11/163,669, filed Oct. 26, 2005, which claims priority to U.S. Provisional Application No. 60/522,814, filed Nov. 11, 2004, both of which are hereby incorporated by reference in their entirety.

FIELD OF THE INVENTION

The invention generally relates to secondary batteries, and more particularly, to cell equalization of such batteries.

BACKGROUND OF THE INVENTION

Generally, secondary (rechargeable) batteries include a string of individual battery cells connected in series to obtain a higher output voltage level. During charging of secondary batteries, inherent differences in the capacity of the individual battery cells may cause the higher capacity cells to achieve full charge first, and then over-charge while the remaining battery cells continue to charge. Depending on the ability of the battery cell chemistry to tolerate this over-charge, cell damage may occur. During discharge, a similar problem may be encountered when the lower capacity battery cells reach minimum voltages first and over-discharge. Cell chemistries such as lead-acid and nickel-cadmium may tolerate moderate forms of these conditions, while other cell chemistries, such as silver-zinc and lithium-ion, may be more easily damaged. The probability of damage due to overcharge may be further aggravated by demand for rapid charging systems that require higher currents and cell temperatures.

For the reasons stated above, charging a series-connected string of individual battery cells normally poses unique monitoring and control difficulties. For example, measuring the voltage of the battery may not necessarily indicate the condition of each individual cell in the battery. If the individual battery cells are, for example, not well balanced, a cell may experience a damaging over-charge condition even though the battery voltage is within acceptable limits. Thus, each battery cell in a string usually is monitored and controlled to insure that each individual battery cell in the series string does not experience an overvoltage condition during charging.

When charging, secondary battery cells generally are bulk charged if the battery cell voltage is above a specified level. Bulk charging continues until any individual cell voltage reaches an upper voltage limit. At the end of bulk charging, one or more battery cells may, however, be only partially charged, and may not have yet reached a 100% state of charge. The partially charged condition is considered adequate for some applications and, thus, the charging process may be terminated prior to each individual cell being 100% charged. Over time, however, the performance of individual cells in the battery may diverge due to each cell being charged to a different level during any one recharge. To minimize divergence, a second step in the charging process often is implemented.

The second step in the charging process is known as "cell equalization." Cell equalization generally begins when a battery cell is "clamped" at an upper voltage limit during equalization. The equalization current usually decreases because the cell voltage is clamped, and not allowed to increase. To protect against cell failure, safeguards to terminate the charging process prior to cell failure often are employed. Cell charging may be terminated (and cell equalization ended) based on a specified cell charge current level (normal condition), a specified over temperature condition (fault condition), and/or a specified cell charge time out (fault condition). At the end of a normal cell equalization termination, the string of individual battery cells connected in series generally is considered at the desired state of charge.

In addition to overcharging, battery cells may experience damage if the cell temperature falls outside a specific range. Thus, cell temperatures are advantageously kept within a specified temperature range during bulk charging and cell equalization to prevent temperature damage from occurring.

Another concern for battery cells is over-discharge. Over-discharge often causes serious performance degradation and damage the cell. Over-discharge may occur when any cell voltage drops below a fixed voltage level. To prevent over-discharge, secondary batteries often are equipped with a mechanism that terminates discharge when any cell drops below a fixed voltage level. Sometimes, however, the cell voltage may rise after the discharge is terminated, so hysteresis may be necessary to prevent oscillations.

Thus, it is generally recognized that recharging a secondary battery having a series connected string of cells preferably is accomplished in a manner that charges each battery cell to substantially the same level while avoiding overcharging any of the cells. Thus, there is a need for a cell equalizing charging system that is low-cost, uses simple circuitry, reduces power dissipation during charging, and operates efficiently.

SUMMARY OF THE INVENTION

A system for charging a secondary battery according to various embodiments of the present invention includes N battery cells connected in series forming a series string, wherein the series string includes at least a battery cell connected to a load end, a battery cell connected to a ground end, and a cell junction between each pair of adjacent battery cells. In accordance with an exemplary embodiment, the system includes a charging set of charging sources (charging set) connected to the series string. In one embodiment, the charging set includes a charging source connected to the load end, and a different charging source connected to each cell junction, respectively.

In accordance with another exemplary embodiment, the system includes a current diverting set of charging sources (diverting set) connected to the series string. In one embodiment, the input terminal of each charging source in the diverting set is connected to a different cell junction, and the output terminal of each charging source is connected to a current return path. In accordance with an aspect of one exemplary embodiment of the present invention, the return path may be a common current return path, on ground. In accordance with another aspect of one exemplary embodiment of the invention, each charging source in the diverting set may include its own current return path.

The charging system, in accordance with one aspect of an exemplary embodiment, may include N charging sources in the charging set. In accordance with another aspect of one exemplary embodiment, the charging system may include (N−1) charging sources in the diverting set.

In one exemplary embodiment, the charging system also includes a power source connected to each input terminal of the charging sources in the charging set, with each charging source in the charging set configured to provide charging current to at least one battery cell via an output terminal of each charging source. In accordance with an aspect of one exemplary embodiment, each charging source in the charging set may be configured to operate in a charging state and a non-charging state, and when operating in the charging state, each charging source provides charging current to a respective cell junction and battery cell where each respective charging source is connected; and when operating in the non-charging state, each charging source does not provide charging current to the respective cell junction and battery cell where each respective charging source is connected. In accordance with another aspect of one exemplary embodiment, each charging source in the diverting set may be configured to operate in a diverting state and a non-diverting state, and when each charging source in the diverting set is operating in the first state, each charging source in the diverting set forms a low impedance electrical path between a cell junction where each particular charging source in the diverting set is connected and the current return path; and when operating in the non-diverting state, each charging source forms a high impedance electrical path between the cell junction where each particular charging source is connected and the return path. In accordance with a further aspect of one exemplary embodiment, the charging system is configured to bypass current around a battery cell that is both (i) located adjacent the cell junction where a particular charging source is operating in the first state, and (ii) between the cell junction where the particular charging source operating in the first state is located and the ground end.

In accordance with another exemplary embodiment, the charging system includes one or more cell monitors. In an aspect of one exemplary embodiment, a cell monitor is connected to each battery cell, and each cell monitor is configured to measure the amount of voltage contained in a battery cell with which the cell monitor is connected.

The system, in accordance with yet another exemplary embodiment, includes a controller connected to each cell monitor, each charging source in the charging set, and each charging source in the diverting set. In an aspect of one exemplary embodiment, each charging source in the charging set is operated by the controller to provide charging current to one or more battery cells containing a terminal voltage below a threshold amount. In an aspect of another exemplary embodiment, each charging source in the diverting set is operated by the controller to divert charging current from one or more battery cells containing a terminal voltage above the threshold amount.

A method for equalizing voltage of a secondary battery being charged according to various embodiments of the present invention includes coupling N battery cells in series to form a series string, coupling a charging set of charging sources to the series string, and coupling a diverting set of charging sources to the series string. In one embodiment, the coupling N battery cells step includes coupling a first battery cell to a load end, coupling a $N^{th}$ battery cell to a ground end, and forming a respective cell junction between each adjacent pair of battery cells in the series string. In another embodiment, the coupling a charging set of charging sources step includes coupling a charging source in the charging set to the first cell and to the load end, and coupling each remaining charging source in the charging set to a different cell junction. In yet another embodiment, the coupling a diverting set of charging sources step includes coupling a different charging source in the diverting set to each respective cell junction. As such, various embodiments of the method include at least coupling one charging source from the charging set and coupling at least one charging source from the diverting set to each cell junction.

In accordance with an aspect of one exemplary embodiment of the invention, the step of coupling a charging set of charging sources may include coupling N charging sources to the series string. In accordance with another embodiment of one exemplary embodiment, the step of coupling a diverting set of charging sources may include coupling (N−1) charging sources to the series string.

In an exemplary embodiment, the method also includes the steps of configuring each charging source in the charging set to selectively provide charging current to one or more of the N battery cells, and configuring each charging source in the diverting set to selectively divert charging current from one or more of the N battery cells. In another embodiment, the method includes configuring each charging source in the charging set to operate in a first (e.g., ON) state or a second (e.g., OFF) state, wherein when a particular charging source is operating in the first state, the charging source provides charging current to a respective cell junction and battery cell where the charging source is coupled, and when the charging source is operating in the second state, the charging source does not provide charging current to the respective cell junction and a battery cell; and configuring each charging source in the diverting set to operate in a first state (e.g., ON) or a second (e.g., OFF) state, wherein when operating in the first state, a particular charging source in the diverting set provides a low impedance electrical path between the return path and the cell junction where the charging source is coupled, and when operating in the second state, the charging source provides a high impedance electrical path between the return path and the cell junction.

In yet another exemplary embodiment, the method includes configuring the charging sources in the charging set to provide charging current to each battery cell containing a terminal voltage below a threshold amount, and configure each charging source the diverting set to not provide charging current to each battery cell containing a terminal voltage above the threshold amount. In still another exemplary embodiment, the method includes coupling a one or more cell monitors to the series string, wherein the monitor(s) is/are configured to monitor a respective voltage level of each of the battery cells, determine which battery cell(s) contain a terminal voltage above the threshold amount, and determining which battery cell(s) contain a terminal voltage below the threshold amount.

Another method for equalizing voltage of a secondary battery being charged according to various embodiments of the present invention includes providing charging current to at least one battery cell in a series string containing a terminal voltage below a pre-determined threshold amount, and preventing charging current from being provided to any battery cell in the series string containing a terminal voltage above the pre-determined threshold amount utilizing a charging source. In one exemplary embodiment, the method also includes switching ON the charging source to cause charging current to flow through the first electrical path, and to not flow through the second electrical path.

BRIEF DESCRIPTION OF THE DRAWINGS

A more complete understanding of the present invention may be derived by referring to the detailed description and claims when considered in connection with the drawing figures, where like reference numbers refer to similar elements throughout the figures, and:

FIG. 4 is a control truth table and operational chart for the topology illustrated in FIG. 3;

FIG. 5 is a flow diagram of an exemplary embodiment of a method for charging a secondary battery utilizing cell equalization; and FIG. 6 is a flow diagram of one embodiment of a method 600 for equalizing voltage of a secondary battery being charged.

DETAILED DESCRIPTION OF THE INVENTION

The detailed description of various exemplary embodiments of the invention herein makes reference to the accompanying figures and drawings. While these exemplary embodiments are described in sufficient detail to enable those skilled in the art to practice the invention, it should be understood that other embodiments may be realized in that logical and mechanical changes may be made without departing from the spirit and scope of the invention. Thus, the detailed description herein is presented for purposes of illustration only and not by way of limitation. For example, the steps recited in any of the method or process descriptions may be executed in any order and are not limited to the order presented.

For the sake of brevity, the apparatus and systems (and components of the individual operating components) are described in detail herein. Furthermore, the coupling lines shown in the various figures contained herein are intended to represent exemplary functional relationships and/or physical couplings between the various elements. It should be noted that many alternative and/or additional functional relationships and/or physical connections may be present in a practical system.

Figure 1:
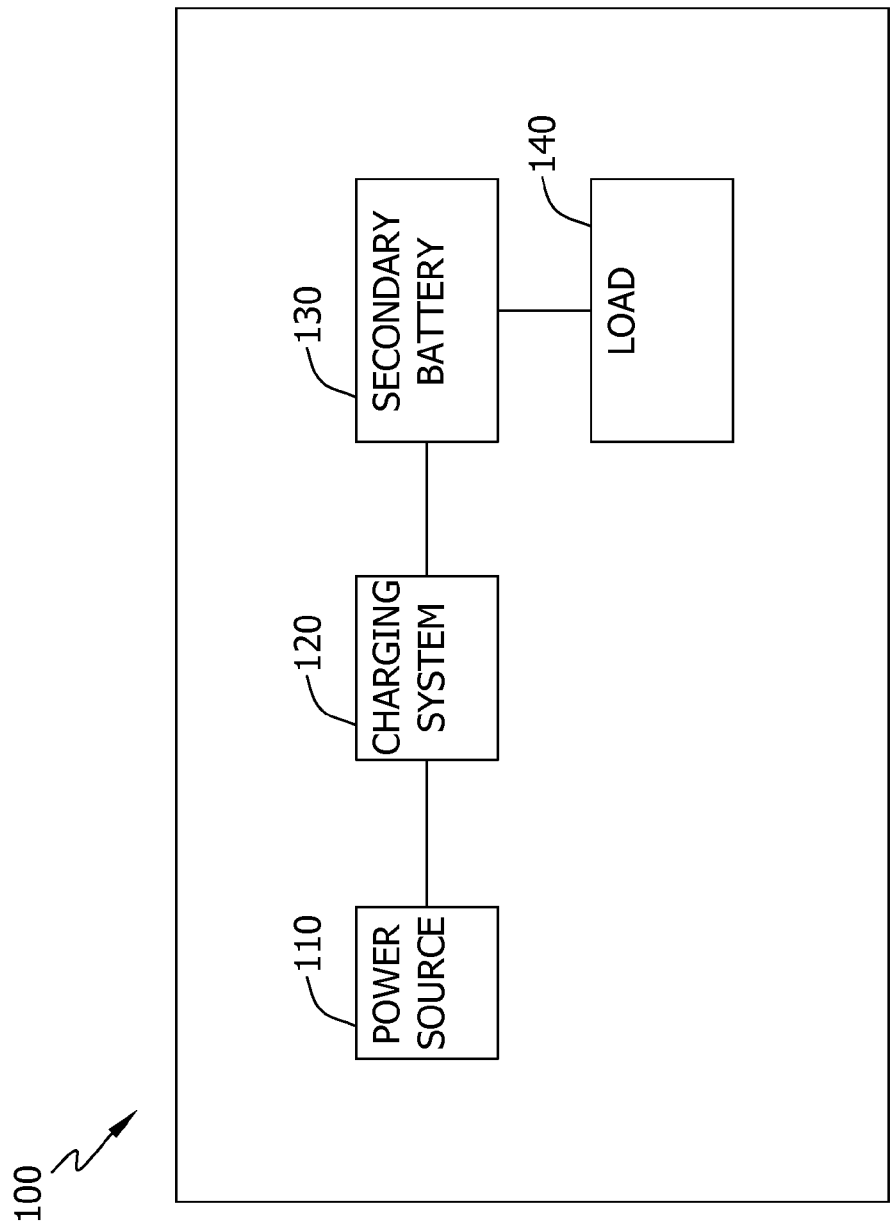
FIG. 1 is a block diagram of one exemplary embodiment of a device including a secondary battery, and a charging system to recharge the secondary battery.

Turning now to the figures, FIG. 1 is a block diagram of one exemplary embodiment of a device 100 including a secondary battery 130 and a charging system 120 to recharge secondary battery 130. Device 100, in one embodiment, includes power source 110. In an exemplary embodiment, power source 110 is a DC power source. In another exemplary embodiment, power source 110 is an AC power source. In an aspect of one exemplary embodiment of the invention (e.g., when power source 110 is a DC power source), power source 110 may be a solar panel such that power source 110 produces a DC signal. In another aspect of the invention (e.g., when power source 110 is an AC power source), power source 110 may be a standard AC outlet along with a transformer, or the like, to provide an appropriate voltage signal for charging secondary battery 130. The invention contemplates that power source 110 may be any DC or AC power source known in the art capable of providing charging current to recharge secondary battery 130.

Device 100, in another exemplary embodiment, includes charging system 120 electrically connected to power source 110. In various aspects of the invention, charging system 120 may be suitably configured (as discussed in greater detail below) to charge one or more battery cells (not shown) within secondary battery 130.

In one exemplary embodiment, secondary battery 130 is a lithium-ion battery. In other embodiments of the invention, secondary battery 130 may be, but is not limited to, a lead-acid battery, a nickel-cadmium battery, a nickel-metal hydride battery, a nickel hydrogen battery, a silver-zinc battery, or any other battery capable of storing a charge and subsequently being recharged after discharge.

Device 100 includes a load 140 which, in an exemplary embodiment, is a device that requires voltage and current. Examples of load 140 include, but certainly are not limited to, a personal digital assistant (PDA), a BlackBerry® device, a cellular phone, a pager, a Palm Pilot® device, and/or any other electronic or communication device capable of being supplied power by secondary battery 130.

Figure 2:
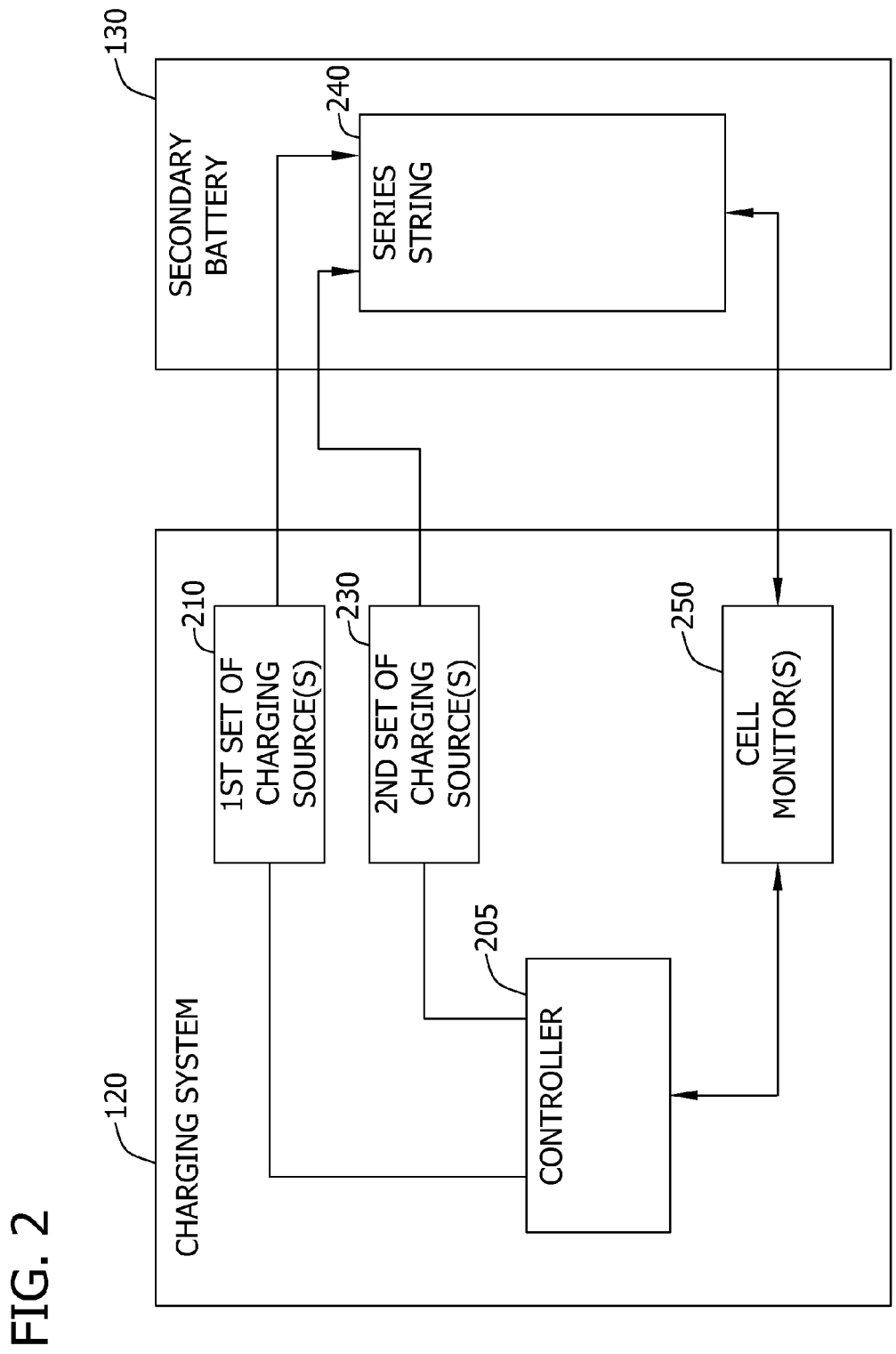
FIG. 2 is a block diagram of an exemplary embodiment of a charging system utilizing cell equalization to charge a secondary battery.

FIG. 2 is a block diagram of an exemplary embodiment of charging system 120 of FIG. 1. Charging system 120, in an exemplary embodiment, includes controller 205, which may be any hardware and/or software suitably configured to switch ON and OFF a charging source. As such, controller 205 may be any controller known in the art capable of switching ON and OFF charging sources when appropriate to do such.

In one exemplary embodiment, controller 205 is connected to a charging set of charging sources 210 (charging set 210). Each charging source in charging set 210 may be any hardware and/or software suitably configured to provide charging current to at least one battery cell when switched ON (i.e., operating in a charging state), and not provide charging current to a battery cell when switched OFF (i.e., operating in a non-charging state). As such, each charging source in charging set 210 may each be any charging source known in the art capable of charging one or more battery cells.

In another exemplary embodiment, controller 205 is also connected to a diverting set of charging sources 230 (diverting set 230). Each charging source in diverting set 230 may be any hardware and/or software suitably configured to provide an electrical path with lower impedance than a path including a battery cell when switched ON, and to provide an electrical path with higher impedance than a path including a battery cell when switched OFF. As such, each charging source in diverting set 230 may each be any charging source known in the art capable of providing a low and/or high impedance electrical path when switched ON and/or OFF, respectively. As used herein, the term "set" means one or more, for example, charging sources.

Charging system 120, in yet another exemplary embodiment, includes series string of battery cells 240 (series string 240). Series string 240, in an exemplary embodiment, includes one or more individual battery cells (not shown), wherein each battery cell voltage is dependent on the cell chemistry. As such, series string 240 may be configured to form a secondary battery of any desired voltage.

Charging system 120, in another exemplary embodiment, includes at least one cell monitor 250 connected to a respective battery cell and controller 205. Cell monitor 250 may be any hardware and/or software suitably configured to monitor the terminal voltage of one or more battery cells. As such, cell monitor 250 may be any cell monitor known in the art capable of detecting the terminal voltage of an individual or plurality of battery cells. In one aspect of the invention, cell monitor 250 may be configured to detect the terminal voltage of a battery cell (with a pre-determined amount of error tolerance). In another aspect of the invention, cell monitor 250 may be configured to determine if a battery cell, with which cell monitor 250 is associated, contains a terminal voltage above or below a pre-determined threshold level. Furthermore, cell monitor 250, in an exemplary embodiment, is configured to communicate the terminal voltage of a battery cell and/or whether the battery cell contains above or below the threshold amount of charge to controller 205. As used herein, the term "above" with reference to a terminal voltage and/or a threshold amount of voltage means substantially the same as or greater than the amount. In addition, the invention contemplates that charging system 120 may be formed on a printed circuit board (PCB) (not shown) or on any other platform known in the art suitable for forming and/or operating charging system 120.

Figure 3:
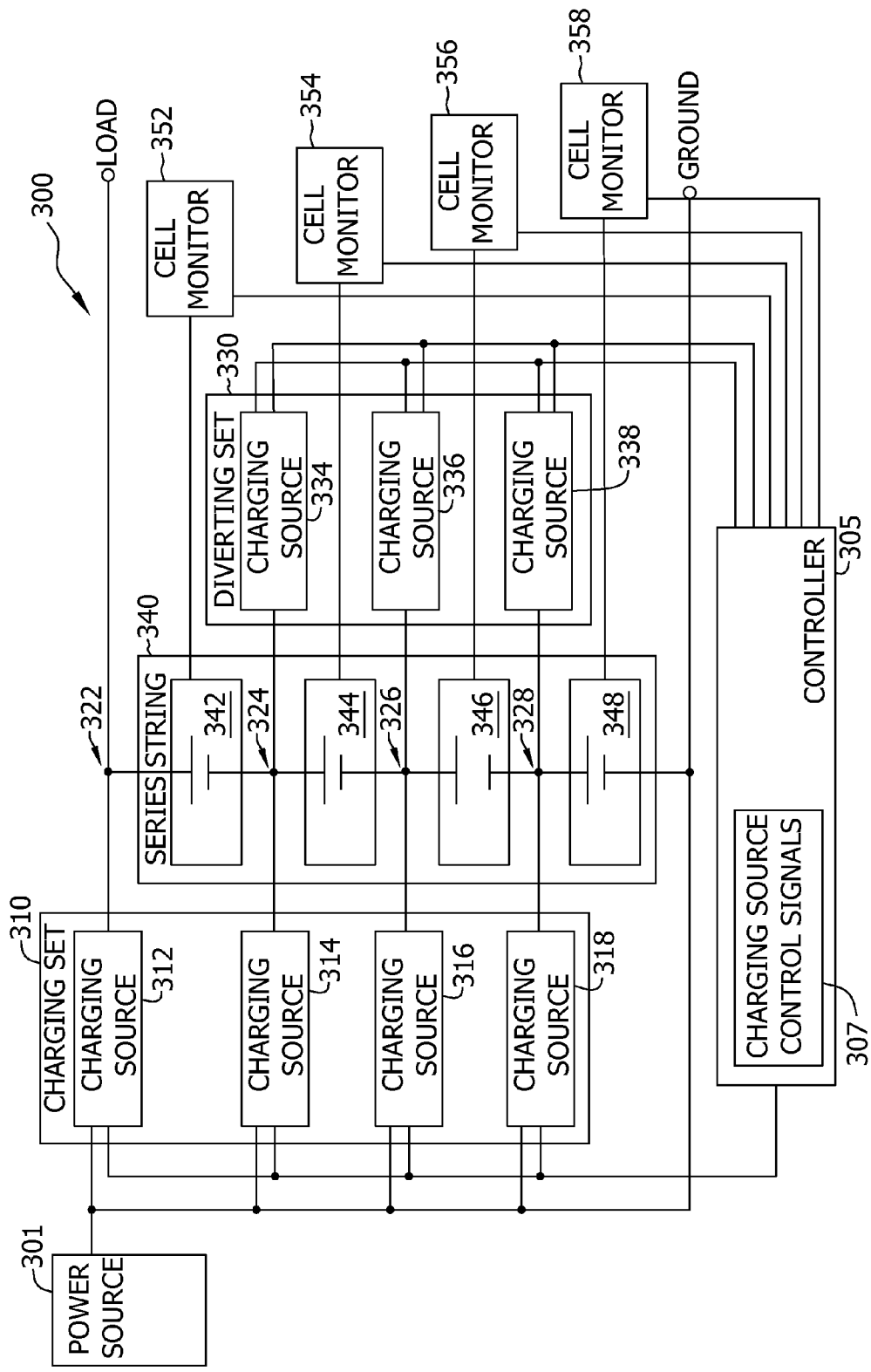
FIG. 3 is block diagram of one exemplary embodiment of a topology of the charging system of FIG. 2.

FIG. 3 is a block diagram of one exemplary embodiment of a topology 300 of charging system 120. In an exemplary embodiment, topology 300 includes a power source 301 connected to a charging set of charging sources 310 (charging set 310). In one exemplary embodiment, power source 301 is configured similar to power source 110 discussed above, and charging set 310 is configured similar to charging set 210 discussed above. In accordance with an aspect of one exemplary embodiment of the present invention, charging set 310 may include a charging source 312, a charging source 314, a charging source 316, and a charging source 318, wherein charging sources 312, 314, 316, and 318 are configured similar to the charging sources included in charging set 210 discussed above, and each charging source in charging set 310 is connected to a different battery cell. Although discussed as including four charging sources (i.e., charging sources 312, 314, 316, and 318), charging set 310 may include any number of charging sources and not depart from the spirit and scope of the invention.

In accordance with an exemplary embodiment of the present invention, the output terminal of charging sources 312, 314, 316, and 318 are each connected to a series string of battery cells 340 (series string 340), wherein series string 340 is configured similar to series string 240 discussed above. In one exemplary embodiment, series string 340 includes a battery cell 342, a battery cell 344, a battery cell 346, and a battery cell 348. Battery cells 342, 344, 346, and 348, in an exemplary embodiment, are lithium-ion battery cells. In other embodiments, battery cells 342, 344, 346, and 348 may be, but are not limited to, lead-acid battery cells, nickel-cadmium battery cells, nickel-metal hydride battery cells, nickel hydrogen battery cells, silver-zinc battery cells, or any other battery cells capable of storing a charge and subsequently being recharged. In addition, the invention contemplates that battery cells 342, 344, 346, and 348 may be any size battery cell known in the art.

In one exemplary embodiment of topology 300, the output terminal of charging source 312 is connected to both battery cell 342 and a load end of charging system 120 via a node 322. In another exemplary embodiment, the output terminal of charging source 314 is connected to battery cell 344 via a node 324. The output terminal of charging source 316, in an exemplary embodiment, is connected to battery cell 346 via a node 326. In still another exemplary embodiment, the output terminal of charging source 318 is connected to battery cell 348 via a node 328. As such, the invention contemplates that nodes 322, 324, 326, and 328 may be any type of node, device, material and/or junction suitably configured to conduct charging current to a battery cell and connect two or more circuit devices.

In accordance with another exemplary embodiment of the present invention, topology 300 includes a diverting set of charging sources 330 (diverting set 330) connected to series string 340. In accordance with an aspect of one exemplary embodiment of the present invention, diverting set 330 may include a charging source 334, a charging source 336, and a charging source 338, wherein charging sources 334, 336, and 338 are each configured similar to the charging sources included in diverting set 330 discussed above. Although discussed as including three charging sources (i.e., charging sources 334, 336, and 338), charging set 330 may include any number of charging sources and not depart from the spirit and scope of the invention. In addition, various embodiments of the invention may be configured such that diverting set 330 will include at least one less charging source than charging set 310.

In an exemplary embodiment of topology 300, an input terminal of charging source 334 is connected to node 324, and an output terminal of charging source 334 is connected to a ground end of charging system 120. In another exemplary embodiment, an input terminal of charging source 336 is connected to node 326, and an output terminal of charging source 336 is connected to the ground end of charging system 120. In yet another exemplary embodiment, an input terminal of charging source 338 is connected to node 328, and an output terminal of charging source 338 is connected to the ground end of charging system 120.

Charging sources 312, 314, 316, 318, 334, 336, and 338 in one exemplary embodiment, are each connected to a controller 305, wherein controller 305 is configured similar to controller 205 discussed above. Controller 305, in an aspect of one exemplary embodiment, may be configured to transmit charging source control signals 307 to charging sources 312, 314, 316, 318, 334, 336, and 338 to control the ON/OFF operation of charging sources 312, 314, 316, 318, 334, 336, and 338. [0041] Topology 300, in another exemplary embodiment, includes a cell monitor 352, a cell monitor 354, a cell monitor 356, and a cell monitor 358, wherein cell monitors 352, 354, 356, and 358 are each configured similar to cell monitor 250 discussed above. In one embodiment, cell monitors 352, 354, 356, and 358 are connected to battery cells 342, 344, 346, and 348, respectively, and are each connected to controller 305. In an exemplary embodiment, cell monitors 352, 354, 356, and 358 are each suitably connected to battery cells 342, 344, 346, and 348 such that cell monitors 352, 354, 356, and 358 are each capable of reading the terminal voltage of battery cells 342, 344, 346, and 348, respectively. In another exemplary embodiment, cell monitors 352, 354, 356, and 358 are suitably connected to controller 305 such that cell monitors 352, 354, 356, and 358 are capable of communicating whether their respective battery cells include a terminal voltage above or below the threshold amount to controller 305.

Topology 300, in another exemplary embodiment, includes a cell monitor 352, a cell monitor 354, a cell monitor 356, and a cell monitor 358, wherein cell monitors 352, 354, 356, and 358 are each configured similar to cell monitor 250 discussed above. In one embodiment, cell monitors 352, 354, 356, and 358 are connected to battery cells 342, 344, 346, and 348, respectively, and are each connected to controller 305. In an exemplary embodiment, cell monitors 352, 354, 356, and 358 are each suitably connected to battery cells 342, 344, 346, and 348 such that cell monitors 352, 354, 356, and 358 are each capable of reading the terminal voltage of battery cells 342, 344, 346, and 348, respectively. In another exemplary embodiment, cell monitors 352, 354, 356, and 358 are suitably connected to controller 305 such that cell monitors 352, 354, 356, and 358 are capable of communicating whether their respective battery cells include a terminal voltage above or below the threshold amount to controller 305.

FIG. 4 is a control truth table and operational chart for topology 300, as illustrated in FIG. 3. For the illustrated embodiment of FIG. 3, there are 16 different permutations of the state of charge for battery cells 342, 344, 346, and 348 during a charging operation. Only a few permutations will be described in detail herein, as doing so will make the other states of the control truth table readily apparent. In the control truth table, column 1 indicates the 16 different possible permutations of FIG. 3. Columns 2, 3, 4, and 5 indicate the state of charge (i.e., fully charged (high) or not fully charged (low)) of battery cells 342, 344, 346, and 348, respectively. Columns 6, 7, 8, and 9 indicate the state of operation (i.e., ON or OFF) of charging sources 312, 314, 316, and 318, respectively. Columns 10, 11, and 12 indicate the state of operation (i.e., ON or OFF) of charging sources 334, 336, and 338, respectively, and column 13 indicates the state of operation of topology 300 (i.e., charging system 120).

In permutation 5, for example, battery cells 342, 346, and 348 are not fully charged and need to be charged, whereas battery cell 344 is fully charged (or at least contains a terminal voltage above a threshold amount) and should not be further charged (i.e., overcharged). In this situation, charging sources 312 and 316 will be switched ON by controller 305 (whereas charging sources 314 and 318 will remain switched OFF) to provide charging current to battery cells 342, 346, and 348. In addition, charging source 334 is also switched ON to divert charging current from being supplied to battery cell 344. In the case of battery cell 342, charging current is supplied to battery cell 342 from charging source 312, wherein charging current is supplied through node 322 to charge battery cell 342. The charging current is then diverted to ground through charging source 334 via node 324. As such, charging source 334, when turned ON, forms an electrical path with lower impedance than the path including battery cell 344 and diverts charging current away from battery cell 344. In the case of battery cells 346 and 348, charging current is supplied to battery cells 346 and 348 from charging source 316, wherein charging current is supplied through node 326 to charge battery cell 346, then through node 328 to charge battery cell 348. In this case, charging source 318 is not switched ON since charging current supplied from charging source 316 is capable of also charging battery cell 348.

As a note, should battery cell 346 become fully charged prior to battery cell 348, controller 305 will switch OFF charging source 316, and switch ON charging source 318 until battery cell 348 becomes fully charged (or charged above the threshold amount). Similarly, should battery cell 348 become fully charged before battery cell 346, controller 305 will switch ON charging source 338 to divert charging current from further charging (i.e., overcharging) battery cell 348.

Permutation 10 is another example of how topology 300 provides charging current to battery cells needing to be charged, but yet does not provide charging current to battery cells fully charged (or containing a terminal voltage above a threshold amount). In this example, battery cells 344 and 346 need to be charged, whereas battery cells 342 and 348 are fully charged (or at least contain a terminal voltage above a threshold amount) and should not be further charged (i.e., over-charged). As such, charging sources 314 and 338 are switched ON by controller 305 (whereas the remaining charging sources will remain switched OFF) to provide charging current to battery cells 344 and 346. In this situation, charging current in supplied to battery cell 344 from charging source 314 through node 324. Charging current is also supplied to battery cell 346 from charging source 314 through node 326. Since charging source 338 is also switched ON, the charging current will bypass battery cell 348 since the path including charging source 338 now has lower impedance than the path including battery cell 348.

Again worth noting, should battery cell 346 become fully charged prior to battery cell 344, controller 305 will switch ON charging source 336 (and switch OFF charging source 338) to divert charging current from further charging (over-charging) battery cell 346. Similarly, should battery cell 344 become fully charged before battery cell 346, controller 305 will switch OFF charging source 314, and switch ON charging source 316, with charging source 338 remaining switched ON.

Permutation 15 illustrates the example of when only one battery cell (i.e., battery cell 348) requires charging. In this example, controller 305 switches ON charging source 318 such that charging current will flow from charging source 318 through node 328 to battery cell 348. As such, battery cells 312, 314, and 316 do not receive charging current since they are fully charged and/or charged above the minimum threshold voltage amount.

The remaining permutations (i.e., permutations 1-4, 6-9, 11-14, and 16) may be analyzed in a manner similar to permutations 5, 10, and 15. Furthermore, the invention contemplates that charging system 120 may include any number of battery cells in series string 240, and corresponding charging sources and cell monitors without departing from the spirit and scope of the invention.

FIG. 5 is a flow diagram of one embodiment of a method 500 for equalizing voltage of a secondary battery being charged. In accordance with an exemplary embodiment of the present invention, method 500 initiates by coupling N battery cells (e.g., battery cells 342, 344, 346, 348) in series to form a series string (e.g., series string 340) (step 505). In one embodiment, the step of coupling N battery cells includes coupling a first battery cell to a load end (step 510). In another embodiment, the step of coupling N battery cells includes coupling a $N^{th}$ battery cell to a ground end (step 515). In yet another embodiment, the step of coupling N battery cells also includes forming a respective cell junction between each adjacent pair of battery cells in the series string (step 520).

In accordance with an exemplary embodiment, method 500 includes coupling a charging set (e.g., charging set 310) of charging sources (e.g., charging sources 312, 314, 316, and 318) to series string 340 (step 525). In one embodiment, the coupling a charging set step includes coupling at least one charging source in charging set 310 to the first battery cell (e.g., battery cell 342) at the load end, and coupling each remaining charging source in the charging set to a respective battery cell in series string 340 via a respective cell junction (e.g., cell junctions 324, 326, and 328).

Method 500, in accordance with another exemplary embodiment, includes coupling a diverting set (e.g., diverting set 330) of charging sources (e.g., charging sources 334, 336, and 338) to series string 340 (step 530). In one embodiment, the coupling a diverting set step includes coupling each charging source in diverting set 330 to each of cell junctions 324, 326, and 328. As such, various embodiments of method 500 includes coupling at least one charging source from charging set 310 and coupling at least one charging source from diverting set 330 to each cell junction in series string 340.

In accordance with an aspect of one exemplary embodiment of the invention, the step of coupling a charging set of charging sources may include coupling N charging sources to series string 340. In accordance with another exemplary embodiment of one embodiment of the invention, coupling a diverting set of charging sources may include the step of coupling (N−1) charging sources to series string 340.

Method 500, in accordance with one exemplary embodiment, includes configuring each charging source in charging set 310 to selectively provide charging current to one or more of the N battery cells (step 535). In accordance with another embodiment, method 500 also includes configuring the charging sources in diverting set 330 to selectively divert charging current from one or more of the N battery cells (step 540). In yet another embodiment, method 500 includes operating each charging source in charging set 310 in an ON state or an OFF state, wherein when a particular charging source is ON, the charging source provides charging current to a respective cell junction and battery cell where the charging source is coupled; and when the charging source is OFF, the charging source does not provide charging current to the respective cell junction and battery cell (step 545). In a further embodiment, method 500 includes operating each charging source in diverting set 330 in an ON state or an OFF state, wherein when ON, a particular charging source in diverting set 330 provides a low impedance electrical path between the ground end and the cell junction where the charging source is coupled; and when OFF, the charging source provides a high impedance electrical path between the return path and the cell junction (step 550).

In accordance with yet another exemplary embodiment, method 500 includes operating the charging sources in charging set 310 and diverting set 330 to provide charging current to each battery cell containing a terminal voltage below a threshold amount, and to not provide charging current to each battery cell containing a terminal voltage above the threshold amount (step 555). In still another exemplary embodiment, method 500 includes coupling one or more cell monitors (e.g., cell monitor 250) to each battery cell in series string 340 to monitor the voltage level of each of the battery cells, determine which battery cells contain a terminal voltage above the threshold amount, and determine which battery cells contain a terminal voltage below the threshold amount (step 560).

FIG. 6 is a flow diagram of one embodiment of a method 600 for equalizing voltage of a secondary battery being charged. In accordance with one exemplary embodiment, method 600 initiates with providing charging current to at least one battery cell in a series string containing a terminal voltage below a pre-determined threshold amount, wherein said charging current is provided to charge said at least one battery cell (step 610). In accordance with another exemplary embodiment, method 600 includes preventing charging current from being provided to any battery cell in said series string containing a terminal voltage above the pre-determined threshold amount utilizing a charging source (step 620).

In one embodiment, the preventing step includes the step of causing a first electrical path to possess an impedance lower than a second electrical path, wherein said second electrical path includes at least one battery cell containing a terminal voltage above said predetermined threshold amount (step 630). In yet another exemplary embodiment, method 600 includes switching ON the charging source to cause charging current to flow through the first electrical path, and to not flow through the second electrical path step 640).

Benefits, advantages and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of the invention. All structural and functional equivalents to the elements of the above-described exemplary embodiments that are known to those of ordinary skill in the art are expressly incorporated herein by reference. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A charging system for charging a rechargeable battery, comprising:
N battery cells coupled in series forming a series string, wherein said series string comprises:
a first battery cell coupled to a load,
a $N^{th}$ battery cell coupled to a ground, and
a cell junction formed between each pair of adjacent battery cells;
a first set of charging sources coupled to said series string, wherein each charging source in said first set of charging sources comprises an input terminal and an output terminal, wherein an input terminal of each of the charging sources of the first set of charging sources is directly connected to a power source, an output terminal of a first charging source of said first set of charging sources is coupled to the load, and an output terminal of each of the other charging sources of the first set of charging sources is coupled to a respective cell junction, wherein each of the charging sources of the first set of charging sources provides a charging current in a first state of operation and does not provide a charging current in a second state of operation and wherein an N−1 charging source of the first set of charging sources provides a charging current for an N−1 battery cell and for the $N^{th}$ battery cell to the cell junction formed between the N−1 battery cell and an N−2 battery cell when operating in the first state;
a second set of charging sources coupled to said series string comprising exactly N−1 charging sources, wherein each charging source in said second set of charging sources comprises an input terminal and an output terminal, wherein an input terminal of each charging source in said second set of charging sources is coupled to a respective cell junction, and an output terminal of each charging source in said second set of charging sources is coupled to the ground, wherein each of the charging sources of the second set of charging sources diverts a charging current to the ground provided by a charging source of the first set of charging sources when operating in a first state and does not divert a charging current to ground when operating in a second state and wherein the N−1 charging source of the second set of charging sources diverts to the ground the charging current for the N−1 battery cell and the charging current for the $N^{th}$ battery cell when operating in the first state and the $N^{th}$ charging source of the second set of charging sources diverts to the ground the charging current for the $N^{th}$ battery cell when operating in the first state of operation; and
a controller for selectively operating each charging source of the first set of charging sources and each charging source of the second set of charging sources in the first state or the second state to provide a charging current to each battery cell having a voltage less than a predetermined voltage.

2. The charging system of claim 1, wherein there are N charging sources in said first set of charging sources.

3. The charging system of claim 1, further comprising:
the power source coupled to each input terminal of said charging sources in said first set of charging sources, wherein each charging source in said first set of charging sources is configured to provide charging current to at least one of said N battery cells.

4. The charging system of claim 3, wherein:
each charging source in said first set of charging sources is configured to operate in a first state and a second state; and when each charging source in said first set of charging sources is operating in said first state, each charging source provides charging current to a respective cell junction and battery cell where each respective charging source is coupled, and when each charging source in said first set of charging sources is operating in said second state, each charging source does not provide charging current to said respective cell junction and battery cell where each respective charging source is coupled.

5. The charging system of claim 1, wherein:
said ground is a charging current common return path to each charging source second set of charging sources to the power source and the first set of charging sources.

6. The charging system of claim 1, wherein when each charging source in said second set of charging sources is operating in said first state, each charging source in said second set of charging sources forms a low impedance electrical path between a cell junction where each particular charging source is coupled and the ground, and when each charging source in said second set of charging sources is operating in said second state, each charging source forms a high impedance electrical path between said cell junction where each particular charging source is coupled and the ground.

7. The charging system of claim 6, wherein the charging system is configured such that when each charging source in said second set of charging sources is operating in said first state, charging current bypasses a battery cell located:
(a) adjacent a cell junction where a particular charging source operating in said first state is coupled, and
(b) between said cell junction where a particular charging source operating in said first state is coupled and the ground.

8. The charging system of claim 1, further comprising:
a plurality of cell monitors, wherein each cell monitor is coupled to a respective battery cell, and configured to measure a terminal voltage in an associated battery cell; and
wherein the controller is coupled to each of said cell monitors, each charging source in said first set of charging sources, and each charging source in said second set of charging sources, and wherein each charging source in said first set of charging sources is operated by said controller to provide charging current to one or more battery cells having a terminal voltage below a threshold amount, and each charging source in said second set of charging sources is operated by said controller to divert charging current to the ground from one or more battery cells having a terminal voltage above said threshold amount.

9. A method for equalizing voltage of a secondary battery being charged, the method comprising the steps of:
coupling N battery cells in series to form a series string, wherein said coupling N battery cells step comprises the steps of:
coupling a first battery cell to a load,
coupling a $N^{th}$ battery cell to a ground to form a respective cell junction between each adjacent pair of battery cells in said series string;
coupling a first set of charging sources to said series string, wherein said coupling a first set of charging sources step comprises the steps of:
coupling a first charging source of said first set of charging sources to said first cell at said load,
coupling each remaining charging source in said first set of charging sources to each cell junction formed on said series string, and
coupling an input terminal of each of the charging sources of the first set of charging sources directly to a power source; and
coupling a second set of charging sources to said series string, said second set of charging sources comprising exactly N−1 charging sources, wherein said coupling a second set of charging sources step comprises the steps of:
coupling an input terminal of each charging source of said second set of charging sources to each cell junction formed on said series string and an output terminal of each charging source of the second set of charging sources to the ground; and
configuring each charging source in said second set of charging sources to operate in one of a first state and a second state, wherein in the first state, a charging source diverts a charging current from the input terminal of the charging source to the ground and in the second state, the charging source does not divert a charging current from the input terminal of the charging source to the ground.

10. The method of claim 9, wherein said coupling a first set of charging sources step comprises the step of:
coupling N charging sources to said series string.

11. The method of claim 9, further comprising the steps of:
configuring each charging source in said first set of charging sources to operate in one of a first state and a second state, wherein said configuring step comprises configuring each charging source in said first set of charging sources to provide charging current to a respective cell junction and battery cell where said first particular charging source is coupled when operating in said first state, and configuring each charging source in said first step to not provide charging current to said respective cell junction and battery cell where said first particular charging source is coupled when operating in said second state; and
wherein said configuring each charging source in said second set of charging sources to operate in one of a first state and a second state step comprises configuring each charging source in said second set of charging sources to form a low impedance electrical path between a return path and a respective cell junction where each charging source in said second set of charging sources is coupled when operating in said first state, to form a high impedance electrical path between said return path and said respective cell junction where each charging source in said second set of charging sources is coupled when operating in said second state.

12. The method of claim 9, further comprising the step of:
configuring each charging source in said first set of charging sources to provide charging current to each battery cell containing a terminal voltage less than a threshold amount; and
configuring each charging source in said second set of charging sources to prevent each battery cell containing a terminal voltage greater than said threshold amount from receiving charging current.

13. The method of claim 9, further comprising the steps of:
coupling a plurality of cell monitors to each battery cell included in said series string, wherein said cell monitors are configured to:

monitor a respective voltage level of each of said N battery cells;

determine which of said N battery cells has a terminal voltage above said threshold amount; and determine which of said N battery cells has a terminal voltage below said threshold amount.

14. The method of claim 9, further comprising the steps of:

configuring each charging source in said first set of charging sources to selectively provide charging current to one or more of said N battery cells; and configuring each charging source in said second set of charging sources to selectively divert charging current from one or more of said N battery cells.

15. A system for charging a rechargeable battery, said rechargeable battery comprising N battery cells configured in a series string, wherein N is at least three, wherein a first battery cell of the at least three battery cells is connected to a load, a third battery cell of the at least three battery cells is connected to a ground, and a second battery cell of the at least three battery cells is connected between the first and third battery cells, and wherein a cell junction is formed between each pair of battery cells, said charging system comprising:

a controller transmitting charging source control signals;

a first set of charging sources coupled to said series string receiving and responsive to charging source control signals from the controller for selectively operating in a first or a second state, said first set of charging sources comprising:

a first charging source of the first set of charging sources comprising an input terminal directly connected to a power source and an output terminal coupled to the load for providing, via the output terminal, a charging current for the first battery cell, a charging current for the second battery cell, and a charging current for the third battery cell when operating in the first state and no charging current when operating in the second state;

a second charging source of the first set of charging sources comprising an input terminal directly connected to the power source and an output terminal connected to the cell junction between the first battery cell and the second battery cell, for providing, to said cell junction, the charging current for the second battery cell and the charging current for the third battery cell when operating in the first state and no charging current when operating in the second state; and a third charging source of the first set of charging sources comprising an input terminal directly connected to the power source and an output terminal connected to the cell junction between the second battery cell and the third battery cell, for providing to said cell junction the charging current for the third battery cell when operating in the first state and no charging current when operating in the second state; and a second set of charging sources comprising exactly N−1 charging sources coupled to said series string receiving and responsive to charging source control signals from the controller for selectively operating in a first or a second state, wherein said second set of charging sources comprises:

a first charging source of the second set of charging sources comprising an input terminal connected to the cell junction between the first battery cell and the second battery cell and an output terminal connected to the ground for diverting to the ground the charging current for the second battery cell and the charging current for the third battery cell provided by the first charging source of the first set of charging sources when operating in the first state and not diverting to the ground the charging current for the second battery cell and the charging current for the third battery cell when operating in the second state; and a second charging source of the second set of charging sources comprising an input terminal connected to the cell junction between the second battery cell and the third battery cell and an output terminal connected to the ground for diverting to the ground the charging current for the third battery cell provided by either the first charging source of the first set of charging sources or the second charging source of the first set of charging sources when operating in the first state and not diverting to ground the charging current for the third battery cell when operating in the second state, and wherein the controller transmits charging source control signals to operate the first charging source of the first set of charging sources in the first state until a voltage of one of the at least three battery cells exceeds a predetermined voltage, and then operates the first set of charging sources and the second set of charging sources to provide charging currents to the battery cells that have not exceeded the predetermined voltage and not the battery cells that have exceeded the predetermined voltage.

16. The system of claim 15 further comprising voltage monitors for measuring the voltage of each of the battery cells and providing the measured voltage to the controller, wherein the first charging source of the first set of charging sources further provides a current to the load when operating in the first state.

* * * * *

UNITED STATES PATENT AND TRADEMARK OFFICE
CERTIFICATE OF CORRECTION

| | | |
|---|---|---|
| PATENT NO. | : 7,821,230 B2 | Page 1 of 1 |
| APPLICATION NO. | : 12/498210 | |
| DATED | : October 26, 2010 | |
| INVENTOR(S) | : William B. Studyvin et al. | |

It is certified that error appears in the above-identified patent and that said Letters Patent is hereby corrected as shown below:

On the Title Page, under Related U.S. Application Data, please replace
(60) Provisional application No. 60/522,814, filed on Nov. 10, 2004.

with

(60) Provisional application No. 60/522,816, filed Nov. 10, 2004.

Signed and Sealed this
Nineteenth Day of April, 2011

David J. Kappos
*Director of the United States Patent and Trademark Office*